(12) United States Patent
Wang

(10) Patent No.: US 12,464,534 B2
(45) Date of Patent: Nov. 4, 2025

(54) INFORMATION INDICATION METHOD AND APPARATUS, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 407 days.

(21) Appl. No.: 18/145,700

(22) Filed: Dec. 22, 2022

(65) Prior Publication Data
US 2023/0239892 A1 Jul. 27, 2023

Related U.S. Application Data

(63) Continuation of application No. PCT/CN2020/131944, filed on Nov. 26, 2020.

(51) Int. Cl.
*H04W 72/23* (2023.01)
*H04W 24/10* (2009.01)
*H04W 28/06* (2009.01)
*H04W 52/36* (2009.01)

(52) U.S. Cl.
CPC .......... *H04W 72/23* (2023.01); *H04W 24/10* (2013.01); *H04W 28/06* (2013.01); *H04W 52/365* (2013.01)

(58) Field of Classification Search
CPC ............. H04W 24/08; H04W 36/0094; H04W 52/0216; H04W 52/0232; H04W 74/0833; H04W 76/11; H04W 76/20; H04W 76/27

USPC ........................................ 370/252, 329, 331
See application file for complete search history.

(56) References Cited

U.S. PATENT DOCUMENTS

| 2016/0029235 | A1* | 1/2016 | Kim ...................... H04W 24/08 370/252 |
|---|---|---|---|
| 2016/0366681 | A1 | 12/2016 | Dinan |
| 2017/0078984 | A1 | 3/2017 | Uemura et al. |
| 2018/0167964 | A1 | 6/2018 | Dinan |
| 2019/0261396 | A1 | 8/2019 | Dinan |

(Continued)

FOREIGN PATENT DOCUMENTS

| CN | 106105301 A | 11/2016 |
|---|---|---|
| CN | 111225396 A | 6/2020 |

OTHER PUBLICATIONS

Huawei (rapporteur), "[Post111-e][919][eDCCA] Efficient activation deactivation of SCG Discussion on SCG deactivation and activation", 3GPP TSG-RAN WG2#112-e R2-2010123, Online, Nov. 2-13, 2020. 20 pages.

(Continued)

*Primary Examiner* — Harun Chowdhury
(74) *Attorney, Agent, or Firm* — PERKINS COIE LLP

(57) ABSTRACT

An information indication method and apparatus, terminal device, and network device are provided, said method comprising: a terminal device receiving first indication information or second indication information, said first indication information being used for indicating a first action of the terminal device when a secondary cell group (SCG) is in a deactivated state, said second indication information being used for indicating a second action of the terminal device when the SCG is in an activated state.

20 Claims, 4 Drawing Sheets

Transmitting, by a network device, first indication information or second indication information to a terminal device, receiving, by the terminal device, the first indication information or the second indication information, the first indication information being used to indicate a first behavior of the terminal device when an SCG is in a deactivated state, the second indication information being used to indicate a second behavior of the terminal device when the SCG is in an activated state

301

(56) References Cited

U.S. PATENT DOCUMENTS

| | | | |
|---|---|---|---|
| 2020/0329488 A1 | 10/2020 | Dinan | |
| 2022/0264486 A1* | 8/2022 | Hu | H04W 76/20 |
| 2023/0109276 A1* | 4/2023 | Wu | H04W 76/11 |
| | | | 370/329 |
| 2023/0189383 A1* | 6/2023 | Liu | H04W 52/0216 |
| | | | 370/329 |
| 2023/0276321 A1* | 8/2023 | Da Silva | H04W 36/0094 |
| | | | 370/252 |

OTHER PUBLICATIONS

ZTE Corporation, Sanechips, "Framework of SCG deactivation and activation", 3GPP TSG-RAN WG2 Meeting #111 electronic R2-2006900, e-meeting, Aug. 17-28, 2020. 6 pages.

International Search Report in the international application No. PCT/CN2020/131944, mailed on Aug. 27, 2021. 5 pages with English translation.

Written Opinion of the International Search Authority in the international application No. PCT/CN2020/131944, mailed on Aug. 27, 2021. 6 pages with English translation.

3GPP TS 38.331 V16.2.0, "3rd Generation Partnership Project; Technical Specification Group Radio Access Network; NR; Radio Resource Control (RRC) protocol specification (Release 16)", Technical Specification, (Sep. 2020). 916 pages.

Huawei, "New WID on further enhancements on Multi-Radio Dual-Connectivity", 3GPP TSG RAN Meeting #86 RP-193249, Sitges, Spain, Dec. 9-12, 2019. 5 pages.

\* cited by examiner

Transmitting, by a network device, first indication information or second indication information to a terminal device, receiving, by the terminal device, the first indication information or the second indication information, the first indication information being used to indicate a first behavior of the terminal device when an SCG is in a deactivated state, the second indication information being used to indicate a second behavior of the terminal device when the SCG is in an activated state  301

FIG. 3

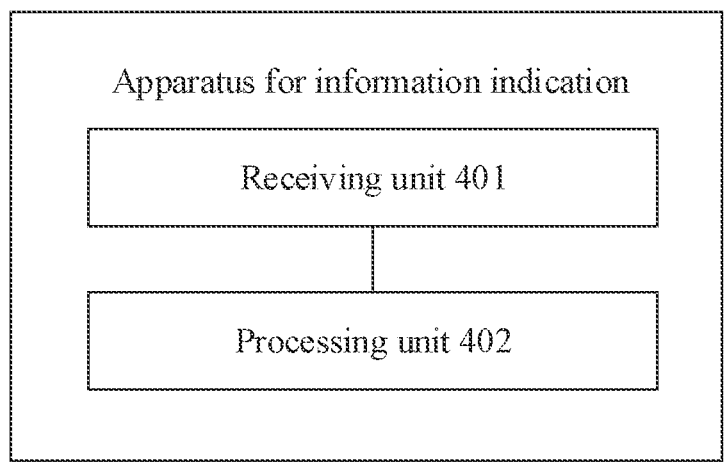

FIG. 4

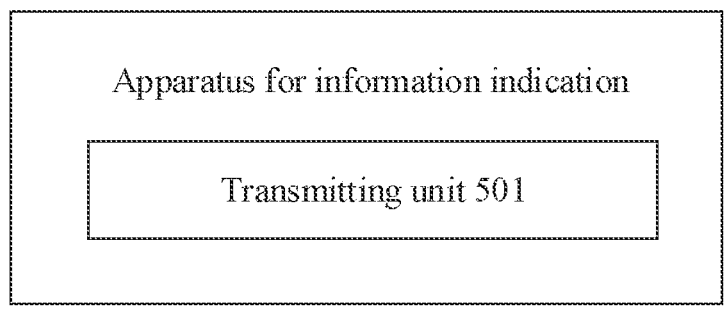

FIG. 5

INFORMATION INDICATION METHOD AND APPARATUS, TERMINAL DEVICE, AND NETWORK DEVICE

CROSS-REFERENCE TO RELATED APPLICATION

This is a continuation application of International Patent Application No. PCT/CN2020/131944, filed on Nov. 26, 2020, entitled "INFORMATION INDICATION METHOD AND APPARATUS, TERMINAL DEVICE, AND NETWORK DEVICE", the disclosure of which is hereby incorporated by reference in its entirety.

BACKGROUND

Secondary cell group (SCG) can be in an activated state or a deactivated state. Compared with SCG in the deactivated state, SCG occupies different resources when the SCG is in the activated state. How to improve the utilization efficiency of resources when the SCG is in these two states remains to be solved.

SUMMARY

Embodiments of the present disclosure relate to the technical field of mobile communication, and in particular to a method and apparatus for information indication, a terminal device and a network device. In embodiments of the present disclosure, there is provided a method and apparatus for information indication, a terminal device and a network device.

The method for information indication provided by the embodiment of the present disclosure includes that:
  a terminal device receives first indication information or second indication information, the first indication information being used to indicate a first behavior of the terminal device when a secondary cell group (SCG) is in a deactivated state, the second indication information being used to indicate a second behavior of the terminal device when the SCG is in an activated state.

The method for information indication provided by the embodiment of the present disclosure includes that:
  a network device transmits first indication information or second indication information to a terminal device, the first indication information being used to indicate a first behavior of the terminal device when an SCG is in a deactivated state, the second indication information being used to indicate a second behavior of the terminal device when the SCG is in an activated state.

The apparatus for information indication provided by the embodiment of the present disclosure is applied to a terminal device and includes a receiving unit.

The receiving unit is configured to receive first indication information or second indication information, the first indication information being used to indicate a first behavior of the terminal device when an SCG is in a deactivated state, the second indication information being used to indicate a second behavior of the terminal device when the SCG is in an activated state.

The apparatus for information indication provided by the embodiment of the present disclosure is applied to a network device and includes a transmitting unit.

The transmitting unit is configured to transmit first indication information or second indication information to a terminal device, the first indication information being used to indicate a first behavior of the terminal device when an SCG is in a deactivated state, the second indication information being used to indicate a second behavior of the terminal device when the SCG is in an activated state.

A terminal device provided by the embodiment of the present disclosure includes a processor and a memory. The memory is configured to store a computer program, and the processor is configured to call and execute the computer program stored in the memory to implement the above method for information indication.

A network device provided by the embodiment of the present disclosure includes a processor and a memory. The memory is configured to store a computer program, and the processor is configured to call and execute the computer program stored in the memory to implement the above method for information indication.

A chip provided by the embodiment of the present disclosure is configured to implement the above method for information indication.

Specifically, the chip includes a processor, which is configured to call and execute a computer program in a memory to cause a device equipped with the chip to implement the above method for information indication.

A computer-readable storage medium provided by the embodiment of the present disclosure is configured to store a computer program that causes a computer to implement the above method for information indication.

A computer program product provided by the embodiment of the present disclosure includes computer program instructions that cause a computer to implement the above method for information indication.

A computer program provided by the embodiment of the present disclosure, when running on a computer, causes the computer to implement the above method for information indication.

BRIEF DESCRIPTION OF THE DRAWINGS

The accompanying drawings illustrated herein are used to provide further understanding of the present disclosure and constitute a part of the present disclosure, and illustrative embodiments of the present disclosure and their description are used to explain the present disclosure instead of constituting improper limitation to the present disclosure. In the accompanying drawings:

FIG. 3 is a flow diagram of a method for information indication provided by an embodiment of the present disclosure.

FIG. 4 is a first structural composition diagram of an apparatus for information indication provided by the embodiment of the present disclosure.

FIG. 5 is a second structural composition diagram of an apparatus for information indication provided by the embodiment of the present disclosure.

DETAILED DESCRIPTION

The technical solution of the embodiments of the present disclosure will be described below in conjunction with the drawings in the embodiments of the present disclosure, and it will be obvious that the described embodiments are part of the embodiments of the present disclosure, but not all of them. Based on the embodiments in the present disclosure, all other embodiments obtained by those of ordinary skill in the art without making creative efforts fall within the scope of protection of the present disclosure.

The technical solution of the embodiments of the present disclosure can be applied to various communication systems, such as long term evolution (LTE) system, LTE frequency division duplex (FDD) system, LTE time division duplex (TDD) system, 5G communication system or future communication system, etc.

Figure 1:
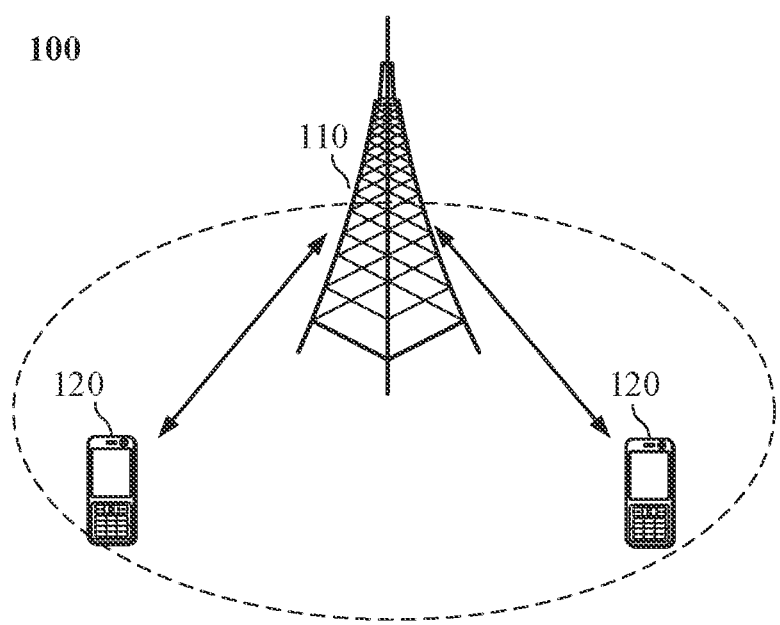
FIG. 1 is a schematic diagram of a communication system architecture provided by an embodiment of the present disclosure.

Exemplary, the communication system 100 applied in the present disclosure embodiment is illustrated in FIG. 1. The communication system 100 may include a network device 110, which may be a device that communicates with a terminal 120 (or referred to as a communication terminal or terminal). The network device 110 may provide communication coverage for a particular geographic area and may communicate with terminal located within the coverage area. Optionally, the network device 110 may be an evolution NodeB (eNB or eNodeB) in an LTE system, or a wireless controller in a cloud radio access network (CRAN), or the network device can be a mobile switching center, relay station, access point, in-vehicle device, wearable device, hub, switch, bridge, router, a network-side device in a 5G network or a network device in a future communication system, etc.

The communication system 100 also includes at least one terminal device 120 located within the coverage area of the network 110. "Terminal" as used herein includes, but is not limited to, a connection via a wireline, such as via a public switched telephone network (PSTN), a digital subscriber line (DSL), a digital cable, a direct cable connection; and/or another data connection/network; and/or via a wireless interface such as a cellular network, a wireless local area network (WLAN), a digital television network such as a DVB-H network, a satellite network, an AM-FM broadcast transmitter; and/or a device of another terminal arranged to receive/transmit a communication signal; and/or Internet of Things (IoT) devices. A terminal arranged to communicate through a wireless interface may be referred to as a "wireless communication terminal", "a wireless terminal", or "a mobile terminal". Examples of mobile terminals include but are not limited to satellite or cellular phones; personal communications system (PCS) terminals that can combine cellular radio telephones with data processing, facsimile, and data communication capabilities; PDA which may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol, (SIP) telephone, wireless local loop (WLL) station, personal digital assistant (PDA), handheld device with wireless communication function, computing device or other processing device connected to wireless modem, in-vehicle device, wearable device, terminal in 5G network or terminal in future evolved PLMN, etc.

Optionally, device to device (D2D) communication may be performed between the terminals 120.

Optionally, the 5G communication system or 5G network may also be referred to as a new radio (NR) system or an NR network.

FIG. 1 exemplarily illustrates one network device and two terminals. Optionally, the communication system 100 may include multiple network devices and other numbers of terminals may be included within the coverage of each network device, which is not limited by embodiments of the present disclosure.

Optionally, the communication system 100 may also include other network entities such as network controllers, mobility management entities and the like, which are not limited by embodiments of the present disclosure.

It should be understood that a device having a communication function in a network/system in embodiments of the present disclosure may be referred to as a communication device. Taking the communication system 100 illustrated in FIG. 1 as an example, the communication device may include a network device 110 and a terminal 120 having a communication function, the network device 110 and the terminal 120 may be specific devices described above and will not be described here. The communication device may also include other devices in the communication system 100 such as network controllers, mobility management entities and other network entities, which are not limited in embodiments of the present disclosure.

It should be understood that the terms "system" and "network" in the present disclosure are often used interchangeably herein. In the present disclosure, the term "and/or" is used to describe an association relationship of associated objects, and for example indicates that there can be three relationships between related objects. For example, A and/or B may mean that the following three situations: Only A exists, both A and B exist, and only B exists. The character "/" in the present disclosure generally indicates an "or" relationship between the associated objects.

In order to facilitate understanding of the technical solution of the embodiments of the present disclosure, the technical solution related to the embodiments of the present disclosure is described below.

With people's pursuit of speed, latency, high-speed mobility, energy efficiency and the diversity and complexity of business in future life, the 3rd generation partnership project (3GPP) international standards organization began to develop 5G. The main application scenarios of 5G include enhanced mobile broadband (eMBB), ultra-reliable low-latency communications (URLLC) and massive machine-type communications (mMTC).

On the one hand, eMBB still aims at users' access to multimedia content, services and data, and its demand is growing rapidly. On the other hand, eMBB may be deployed in different scenarios, such as indoor, urban, rural, etc., and its capabilities and requirements are quite different, so it cannot be generalized and must be analyzed in detail in combination with specific deployment scenarios. Typical applications of URLLC include: industrial automation, power automation, telemedicine operation (surgery), traffic safety and so on. The typical characteristics of MMTC include: high connection density, small data volume, delay-insensitive services, low cost of modules and long service life.

In the early deployment of NR, it is difficult to obtain complete NR coverage, so the typical network coverage is wide-area LTE coverage and NR island coverage mode. Moreover, a large number of LTE are deployed below 6 GHz, and there are few spectrums below 6 GHz available for 5G. Therefore, NR must study the spectrum application above 6 GHz, but the high frequency band has limited coverage and fast signal fading. At the same time, in order to protect the early investment of mobile operators in LTE, a working mode of tight interworking between LTE and NR is proposed.

In order to realize the 5G network deployment and commercial application as soon as possible, 3GPP will complete the first 5G version before the end of December 2017, that is, E-UTRA-NR dual connectivity (EN-DC). In an EN-DC, an LTE base station (eNB) serves as a master node (MN) and an NR base station (gNB or en-gNB) serves as a secondary node (SN). MN is mainly responsible for RRC control function and control plane leading to core network. SN can be configured with auxiliary signaling, such as SRB3, which mainly provides data transmission function.

In the later stage of R15, other dual connectivity (DC) modes will be supported, namely NR-E-UTRA dual connectivity (NE-DC), 5GC-EN-DC and NR DC. For EN-DC, the core network connected to the access network is evolved packet core network (EPC), while for other DC modes, the core network connected to the access network is 5G core network (5GC).

Figure 2:
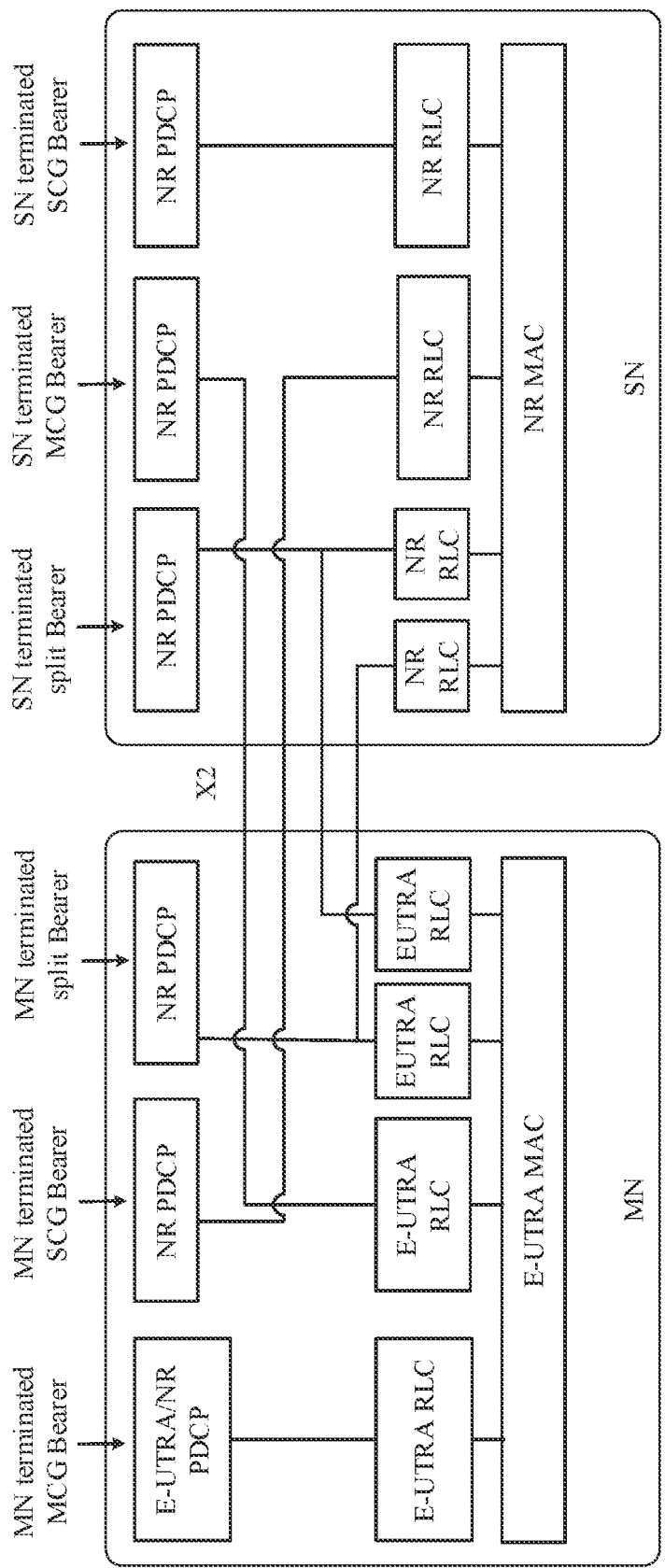
FIG. 2 is a schematic diagram of bearer types provided by an embodiment of the present disclosure.

In Multi-RAT dual connectivity (MR-DC), referring to FIG. 2, the bearer types are divided into MN terminated MCG bearer, MN terminated SCG bearer, MN terminated split bearer, SN terminated MCG bearer, SN terminated SCG bearer and SN terminated split bearer. "MN terminated" means that the packet data convergence protocol (PDCP) resource (i.e. PDCP entity) corresponding to the bearer is located on the MN side, and "SN terminated" means that the PDCP resource used by the bearer is located on the SN side. "MCG bearer" means that the RLC/MAC/PHY resources used by the bearer are located on the MN side, "SCG bearer" means that the RLC/MAC/PHY resources used by the bearer are located on the SN side, and "split bearer" means that the RLC/MAC/PHY resources used by the bearer are located on the MN side and SN side.

In order to support energy saving of terminal device and fast establishment of SCG, the standard agrees to support the concept of dormancy SCG. The dormancy SCG means that all cells in SCG are in dormancy state, and cells in dormancy state do not listen to physical downlink control channel (PDCCH), do not transmit and receive data, but perform radio resource management (RRM), channel status indicator (CSI) measurement and beam management.

In addition, the SCG can also be in a deactivated state or an activated state, and the SCG enters the deactivated state after being deactivated, and the SCG enters the activated state after being activated. Compared with the SCG in the deactivated state, the resources occupied by the SCG side are different when the SCG is in the activated state. Therefore, the resources of the SCG side and the resources of the MCG side can be dynamically allocated by limiting the behaviors of the terminal device in these two states.

Therefore, the following technical solution of the embodiments of the present disclosure is proposed. Through the technical solution of the embodiment of the present disclosure, the MCG dynamically uses the resources allocated to the SCG side by constraining the first behavior of the terminal device when the SCG is in the deactivated state and the second behavior of the terminal device when the SCG is in the activated state, thereby improving the resource utilization efficiency.

It should be noted that the description of the "MCG side" may also be referred to as the "MN side" and the description of the "SCG side" may also be referred to as the "SN side" in the embodiments of the present disclosure.

FIG. 3 is a flow diagram of a method for information indication provided by an embodiment of the present disclosure. As illustrated in FIG. 3, the method for information indication includes the following operation.

At block 301, a network device transmits first indication information or second indication information to a terminal device, and the terminal device receives first indication information or second indication information, the first indication information being used to indicate a first behavior of the terminal device when a secondary cell group (SCG) is in a deactivated state, the second indication information being used to indicate a second behavior of the terminal device when the SCG is in an activated state.

The technical solution of the embodiments of the present disclosure is applied to DC architecture, the master node in the DC is an MN, and the secondary node in the DC is an SN, that is, the MN and the SN are two nodes of the DC. The cell group on the MN side is called MCG, and the cell group on the SN side is called SCG. Embodiments of the present disclosure are not limited to the type of DC and may be, for example, MR-DC, EN-DC, NE-DC, NR-DC, etc.

In the embodiment of the present disclosure, the network device can be a base station or a wireless network access node. In DC architecture, the network device may be an MN.

In the embodiment of the present disclosure, in an optional manner, the first indication information is SCG deactivation indication information. The SCG deactivation indication information is used to trigger the SCG to enter the deactivated state, and the SCG deactivation indication information can implicitly indicate the first behavior of the terminal device when the SCG is in the deactivated state. In another optional manner, the first indication information is indication information different from the SCG deactivation indication information, and the first indication information can directly and explicitly indicate the first behavior of the terminal device when the SCG is in the deactivated state.

In the embodiment of the present disclosure, in an optional manner, the second indication information is SCG activation indication information. The SCG activation indication information is used to trigger the SCG to enter the activated state, and the SCG activation indication information can implicitly indicate the second behavior of the terminal device when the SCG is in the activated state. In another optional manner, the second indication information is indication information different from the SCG activation indication information, and the second indication information can directly and explicitly indicate the second behavior of the terminal device when the SCG is in the activated state.

The first behavior of the terminal device when the SCG is in the deactivated state and the second behavior of the terminal device when the SCG is in the activated state are described below respectively.

(1) Dynamically Changing Power Control Constraints, and Triggering PHR Reporting In an optional manner of the present disclosure, the first indication information being used to indicate the first behavior of the terminal device when the SCG is in the deactivated state includes at least one of the following:

the terminal device determines an actual uplink maximum transmit power based on at least one of an uplink maximum transmit power supported by the terminal device or a cell maximum transmit power;

the terminal device reports a power headroom report (PHR).

Specifically, the terminal device ignores an uplink transmit power limit configured by a network side and determines the actual uplink maximum transmit power based on at least one of the uplink maximum transmit power supported by the terminal device or the cell maximum transmit power. For example, the terminal device takes the minimum value between the uplink maximum transmit power supported by the terminal device and the cell maximum transmit power as the actual uplink maximum transmit power. For example, the terminal device takes the uplink maximum transmit power supported by the terminal device as the actual uplink maximum transmit power. For example, the terminal device takes the cell maximum transmit power as the actual uplink maximum transmit power.

In an optional manner of the present disclosure, the second indication information being used to indicate the second behavior of the terminal device when the SCG is in the activated state includes at least one of the following:

the terminal device determines an actual uplink maximum transmit power based on an uplink transmit power limit configured by a network side;

the terminal device reports a PHR.

For example, the terminal device takes the uplink transmit power limit configured by the network side as the actual uplink maximum transmit power.

In the above scheme, the uplink transmit power limit configured by the network side includes at least one of the following: the uplink maximum transmit power on the MN side or the uplink maximum transmit power on the SN side. It should be noted that the uplink transmit power limit is configured per UE.

In the above scheme, the uplink maximum transmit power supported by the terminal device represents a capability of the terminal device. The uplink maximum transmit power supported by the terminal device can be reflected by a power class, and different power classes correspond to different uplink maximum transmit power capabilities.

In the above scheme, the cell maximum transmit power is configured per cell, and a cell may transmit the cell maximum transmit power of the cell through the system broadcast message.

In the above scheme, the actual uplink maximum transmit power is the uplink maximum transmit power of the terminal device during actual transmission, and other power headroom (PH) calculation, channel power calculation, signal power calculation and the like need to be determined based on the actual uplink maximum transmit power.

In the above scheme, the PHR is reported at cell granularity, and the terminal device reports the PHR of all cells in an activated state which are on the MN side and/or the SCG side.

In the embodiment of the present disclosure, when the SCG is in a deactivated state (or after the SCG is deactivated), the terminal device executes at least one of the following behaviors: 1) the terminal device determines an actual uplink maximum transmit power based on at least one of an uplink maximum transmit power supported by the terminal device or a cell maximum transmit power; 2) the terminal device reports a PHR. Here, the following trigger factor can be added to the trigger factors reported by the PHR: the SCG has been deactivated.

In the embodiment of the present disclosure, when the SCG is in an activated state (or after the SCG is activated), the terminal device executes at least one of the following behaviors: 1) the terminal device determines an actual uplink maximum transmit power based on an uplink transmit power limit configured by a network side; 2) the terminal device reports a PHR. Here, the following trigger factor can be added to the trigger factors reported by the PHR: the SCG has been activated.

In an example, the first indication information may be represented by pCDynamicChange IE, and the uplink transmit power limit configured by the network side may be represented by p-NR-FR1 (i.e., uplink maximum transmit power on the MN side). The configuration of the first indication information is shown with reference to Table 1 below.

TABLE 1

| PhysicalCellGroupConfig ::= | | SEQUENCE { | |
|---|---|---|---|
| harq-ACK-SpatialBundlingPUCCH OPTIONAL, -- Need S | | ENUMERATED { true } | |
| harq-ACK-SpatialBundlingPUSCH OPTIONAL, -- Need S | | ENUMERATED { true } | |
| p-NR-FR1 -- Need R | P-Max | | OPTIONAL, |
| pdsch-HARQ-ACK-Codebook | | ENUMERATED { semiStatic, dynamic }, | |
| tpc-SRS-RNTI -- Need R | RNTI-Value | | OPTIONAL, |
| tpc-PUCCH-RNTI -- Need R | RNTI-Value | | OPTIONAL, |
| tpc-PUSCH-RNTI -- Need R | RNTI-Value | | OPTIONAL, |
| sp-CSI-RNTI -- Need R | RNTI-Value | | OPTIONAL, |
| cs-RNTI -- Need M | SetupRelease { RNTI-Value } | | OPTIONAL, |
| . . . , | | | |
| [ [ | | | OPTIONAL, |
| mcs-C-RNTI -- Need R | RNTI-Value | | |
| p-UE-FR1 | P-Max | | OPTIONAL |

TABLE 1-continued

```
-- Cond MCG-Only
  pCDynamicChange          BOOLEAN     OPTIONAL,
====omit some IE=======
}
```

(2) Dynamically Changing the Header Compression Function

In an optional manner of the present disclosure, the first indication information being used to indicate the first behavior of the terminal device when the SCG is in the deactivated state includes:

the terminal device enables at least one of a robust header compression (ROHC) function or an Ethernet header compression (EHC) function of at least one designated data resource bearer (DRB), and the at least one DRB is determined based on a configuration of a network side.

In an optional manner of the present disclosure, the second indication information being used to indicate the second behavior of the terminal device when the SCG is in the activated state includes:

the terminal device disables at least one of an ROHC function or an EHC function of at least one designated DRB, and the at least one DRB is determined based on a configuration of a network side.

In an optional manner, the at least one DRB is determined based on first configuration information, and the first configuration information is used to configure at least one of the ROHC function or the EHC function of at least one DRB to support disabling and enabling dynamically.

In the embodiment of the present disclosure, after the terminal device receives the SCG deactivation indication information, the SCG is in the deactivated state (or the SCG is deactivated), and the terminal device executes the following behaviors: the terminal device enables at least one of an ROHC function or an EHC function of at least one designated DRB. Here, at least one DRB may be determined based on explicit indication information on the network side, or based on first configuration information. The network side can configure the ROHC function and/or EHC function of some DRBs through the first configuration information to support disabling and enabling dynamically, for example, the ROHC function and/or EHC function of some DRBs support dynamical enabling when the SCG is in the deactivated state.

In the embodiment of the present disclosure, after the terminal device receives the SCG activation indication information, the SCG is in the activated state (or the SCG is activated), and the terminal device executes the following behaviors: the terminal device disables at least one of an ROHC function or an EHC function of at least one designated DRB. Here, at least one DRB may be determined based on explicit indication information on the network side, or based on first configuration information. The network side can configure the ROHC function and/or EHC function of some DRBs through the first configuration information to support disabling and enabling dynamically, for example, the ROHC function and/or EHC function of some DRBs support dynamical disabling when the SCG is in the activated state.

In an example, the first configuration information may be represented by rOHCDynamicChange IE and/or eHCDynamicChange IE, and the configuration of the first configuration information is shown with reference to Table 2 below.

```
PDCP-Config :: =                  SEQUENCE {
    drb                               SEQUENCE {
        discardTimer                      ENUMERATED {ms10, ms20, ms30, ms40, ms50, ms60, ms75,
ms 100, ms150, ms200,
                                                      ms250, ms300, ms500, ms50, ms1500,
infinity }    OPTIONAL, -- Cond Setup
        pdcp-SN-SizeUL ENUMERATED { len12bits, len18bits }              OPTIONAL,
-- Cond Setup2
        pdcp-SN-SizeDL ENUMERATED { len12bits, len18bits }              OPTIONAL,
-- Cond Setup2
        headerCompression             CHOICE {
            notUsed                       NULL,
            rohc                          SEQUENCE {
                maxCID                        INTEGER (1 .. 16383)              DEFAULT
15,
                profiles                      SEQUENCE {
                    profile0x0001                 BOOLEAN,
                    profile0x0002                 BOOLEAN,
                    profile0x0003                 BOOLEAN,
                    profile0x0004                 BOOLEAN,
                    profile0x0006                 BOOLEAN,
                    profile0x0101                 BOOLEAN,
                    profile0x0102                 BOOLEAN,
                    profile0x0103                 BOOLEAN,
                    profile0x0104                 BOOLEAN
                },
                drb-ContinueROHC              ENUMERATED { true }              OPTIONAL
-- Need N
            },
            uplinkOnlyROHC                SEQUENCE {
                maxCID                        INTEGER (1 .. 16383)              DEFAULT
```

```
15,
        profiles                      SEQUENCE {
            profile0x0006             BOOLEAN
        },
        drb-ContinueROHC              ENUMERATED { true }                     OPTIONAL
-- Need N
        },
        rOHCDynamicChange             BOOLEAN       OPTIONAL,
        ...
    },
    integrityProtection          ENUMERATED { enabled }                       OPTIONAL,
-- Cond ConnectedTo5GC1
    statusReportRequired         ENUMERATED { true }                          OPTIONAL,
-- Cond Rlc-AM-UM
    outOfOrderDelivery           ENUMERATED { true }                          OPTIONAL
-- Need R
    }                                                                         OPTIONAL,
Cond DRB
    moreThanOneRLC          SEQUENCE {
        primaryPath             SEQUENCE {
            cellGroup           CellGroupId                                   OPTIONAL,
-- Need R
            logicalChannel      LogicalChannelIdentity                        OPTIONAL
-- Need R
        },
        ul-DataSplitThreshold   UL-DataSplitThreshold                         OPTIONAL,
-- Cond SplitBearer
        pdcp-Duplication        BOOLEAN                                       OPTIONAL
-- Need R
    }                                                                         OPTIONAL,
-- Cond MoreThanOneRLC
    t-Reordering                ENUMERATED {
                                    ms0, ms1, ms2, ms4, ms5, ms8, ms10, ms15, ms20,
ms30, ms40,
                                    ms50, ms60, ms80, ms100, ms120, ms140, ms160,
ms180, ms200, ms220,
                                    ms240, ms260, ms280, ms300, ms500, ms750, ms1000,
ms1250,
                                    ms1500, ms1750, ms2000, ms2250, ms2500, ms2750,
                                    ms3000, spare28, spare27, spare26, spare25,
spare24,
                                    spare23, spare22, spare21, spare20,
                                    spare19, pare18, spare17, spare16, spare15,
spare14,
                                    spare13, spare12, spare11, spare10, spare09,
                                    spare08, spare07, spare06, spare05, spare04,
spare03,
                                    spare02, spare01 }                       OPTIONAL,
-- Need S
    ...,
    [[
    cipheringDisabled           ENUMERATED { true }                           OPTIONAL
-- Cond ConnectedTo5GC
    ]],
    [[
    discardTimerExt-r16         SetupRelease { DiscardTimerExt-r16 }
OPTIONAL,      -- Cond DRB2
    moreThanTwoRLC-DRB-r16      SEQUENCE {
        splitSecondaryPath-r16  LogicalChannelIdentity                        OPTIONAL,
-- Cond SplitBearer2
        duplicationState-r16    SEQUENCE (SIZE (3)) OF BOOLEAN                OPTIONAL
-- Need S
    }                                                                         OPTIONAL,
-- Cond MoreThanTwoRLC-DRB
    ethernetHeaderCompression-r16   SetupRelease { EthernetHeaderCompression-r16 }
OPTIONAL    -- Need M
    ]]
}
EthernetHeaderCompression-r16 ::=   SEQUENCE {
    ehc-Common-r16                  SEQUENCE {
        ehc-CID-Length-r16          ENUMERATED { bits7, bits15 },
        ...
    },
    ehc-Downlink-r16                SEQUENCE {
        drb-ContinueEHC-DL-r16      ENUMERATED { true }                       OPTIONAL,
-- Need R
        ...
    }                                                                         OPTIONAL,
-- Need M
```

-continued

```
  ehc-Uplink-r16              SEQUENCE {
    maxCID-EHC-UL-r16         INTEGER (1 .. 32767),
    drb-ContinueEHC-UL-r16    ENUMERATED { true }                OPTIONAL,
-- Need R
    . . .
    eHCDynamicChange          BOOLEAN    OPTIONAL,
}
-- Need M
}                                                                OPTIONAL
UL-DataSplitThreshold ::= ENUMERATED {
                                       b0, b100, b200, b400, b800, b1600, b3200,
b6400, b12800, b25600, b51200, b102400, b204800,
                                       b409600, b819200, b1228800, b1638400,
b2457600, b3276800, b4096000, b4915200, b5734400,
                                       b6553600, infinity, spare8, spare7,
spare6, spare5, spare4, spare3, spare2, spare1}
DiscardTimerExt-r16 ::= ENUMERATED {ms0dot5, ms1, ms2, ms4, ms6, ms8, spare2, spare1}
```

(3) Dynamically Changing the Number Constraint of PDCCH Blind Detection

In an optional manner of the present disclosure, the first indication information is further used to indicate a first physical downlink control channel (PDCCH) blind detection configuration employed when the SCG is in the deactivated state. Correspondingly, the first indication information being used to indicate the first behavior of the terminal device when the SCG is in the deactivated state includes:
  the terminal device performs PDCCH blind detection on a search space in a target slot on a master cell group (MCG) side according to the first PDCCH blind detection configuration.

In an optional manner of the present disclosure, the second indication information being used to indicate the second behavior of the terminal device when the SCG is in the activated state includes:
  the terminal device performs PDCCH blind detection on a search space in a target slot on an MCG side according to a second PDCCH blind detection configuration configured by a network side.

It should be noted that the target slot may be the current slot being detected by the terminal device.

It should be noted that the PDCCH blind detection configuration is used to determine the number of PDCCH blind detection. When the SCG is in the deactivated state, the number of PDCCH blind detection performed by the terminal device is less. When the SCG is in the activated state, the number of PDCCH blind detection performed by the terminal device is more. Based on this, the number of PDCCH blind detection determined based on the first PDCCH blind detection configuration (i.e. the PDCCH blind detection configuration employed when the SCG is in the deactivated state) is smaller than the number of PDCCH blind detection determined based on the second PDCCH blind detection configuration (i.e. the PDCCH blind detection configuration employed when the SCG is in the activated state). When the SCG is in a deactivated state and the number of PDCCH blind detection performed by the terminal device exceeds the number of PDCCH blind detection determined by the first PDCCH blind detection configuration, the PDCCH blind detection is stopped. When the SCG is in an activated state and the number of PDCCH blind detection performed by the terminal device exceeds the number of PDCCH blind detection determined by the second PDCCH blind detection configuration, the PDCCH blind detection is stopped.

In an example, the first PDCCH blind detection configuration employed when the SCG is in the deactivated state can be represented by pdcch-BlindDetectionSCGDeactivation. The second PDCCH blind detection configuration employed when the SCG is in the activated state can be represented by pdcch-BlindDetection.

In the embodiment of the present disclosure, after the terminal device receives the SCG deactivation indication information, the SCG is in the deactivated state (or the SCG is deactivated), and the terminal device executes the following behavior: the terminal device performs PDCCH blind detection on a search space configured in a current slot on an MCG side according to the PDCCH blind detection capability of the terminal device and/or the above first PDCCH blind detection configuration.

In the embodiment of the present disclosure, after the terminal device receives the SCG activation indication information, the SCG is in the activated state (or the SCG is activated), and the terminal device executes the following behavior: the terminal device performs PDCCH blind detection on a search space configured in a current slot on an MCG side according to the second PDCCH blind detection configuration configured by a network side.

In an optional manner, the network device transmits the third indication information to the terminal device, and the terminal device receives the third indication information, the third indication information being used to indicate whether to dynamically change a PDCCH blind detection limit;
  A) in response to that the third indication information indicates to dynamically change the PDCCH blind detection limit, the terminal device performs PDCCH blind detection on the search space in the target slot on the MCG side according to a first PDCCH blind detection configuration when the SCG is in the deactivated state; the terminal device performs PDCCH blind detection on the search space in the target slot on the MCG side according to a second PDCCH blind detection configuration configured by a network side when the SCG is in the activated state;
  B) in response to that the third indication information indicates not to dynamically change the PDCCH blind detection limit, the terminal device performs PDCCH blind detection on the search space in the target slot on the MCG side according to the second PDCCH blind detection configuration configured by the network side when the SCG is in the deactivated state or the activated state.

In the embodiment of the present disclosure, the terminal device dynamically changes the number of PDCCH blind detection according to the SCG activation indication information or the SCG deactivation indication information, and can determine whether to realize the dynamically changing of the PDCCH blind detection limit through the indication of the network side. The indication of the network side is the above third indication information.

In an example, the third indication information may be represented by pdcch-BlindDetectionDynamicChange IE, the configuration of the third indication information is shown with reference to Table 3 below.

TABLE 3

```
PhysicalCellGroupConfig : :=    SEQUENCE {
=========omit some text==========
    [ [
     pdcch-BlindDetection    SetupRelease { PDCCH-BlindDetection }    OPTIONAL
-- Need M
    ] ],
    [ [
        pdcch-BlindDetectionSCGDeactivation    SetupRelease
{ PDCCH-BlindDetection }OPTIONAL
    ] ],
    [ [ pdcch-BlindDetectionDynamicChange    BOOLEAN    OPTIONAL

] ],
=========omit some text==========
}
```

When pdcch-BlindDetectionDynamicChange IE is set to true, it means that the third indication information indicates to dynamically change the PDCCH blind detection limit. In this case, the terminal device dynamically changes the PDCCH blind detection limit according to the SCG activation indication information or the SCG deactivation indication information. Specifically, if the terminal device has received the SCG deactivation indication information, the first PDCCH blind detection configuration indicated by the SCG deactivation indication information is employed to perform PDCCH blind detection; If the terminal device has received the SCG activation indication information, the second PDCCH blind detection configuration originally configured by the network side is employed to perform PDCCH blind detection. If the pdcch-BlindDetectionDynamicChange IE is set to false, it means that the third indication information indicates not to dynamically change the PDCCH blind detection limit. In this case, the terminal device performs PDCCH blind detection according to the second PDCCH blind detection configuration originally configured by the network side, and the SCG activation indication information or the SCG deactivation indication information has no influence on PDCCH blind detection.

(4) Dynamically Changing the Measurement Period

In an optional manner of the present disclosure, the first indication information being used to indicate the first behavior of the terminal device when the SCG is in the deactivated state includes:

the terminal device performs a measurement on a service frequency point of an SCG side based on an SS/PBCH block measurement timing configuration (SMTC) cycle limit configured by a network side.

Here, the SMTC cycle limit configured by the network side can be implemented in the following two manners:

I) the SMTC cycle limit configured by the network side is used to indicate that the terminal device performs a measurement on one SMTC measurement window in every N SMTC measurement windows, N being an integer greater than 1.

In the embodiment of the present disclosure, the measurement behavior of the terminal device is relaxed when the SCG is in the deactivated state, that is, the terminal device can reduce the number of measurements. For example, in the currently configured SMTC measurement windows, the terminal device can perform a measurement on one SMTC measurement window in every N SMTC measurement windows, so that the number of measurements becomes 1/N of the original number. Here, the value of N can be configured by the network side.

It should be noted that in this case, it is equivalent to expanding the period of SMTC measurement window from the original T to N×T.

II) the SMTC cycle limit configured by the network side is used to indicate at least one of a first period or a first length of an SMTC measurement window, the first period is greater than or equal to a designated period, and the first length is less than or equal to a designated length.

It should be noted that the designated period may be the period of the SMTC measurement windows originally configured, that is, the period of the SMTC measurement windows when the SCG is in the activated state. The designated length may be the length of the SMTC measurement window originally configured, that is, the length of the SMTC measurement window when the SCG is in the activated state.

In the embodiment of the present disclosure, the measurement behavior of the terminal device is relaxed when the SCG is in the deactivated state, that is, the terminal device can reduce the number of measurements and/or the measurement time. For example, the network side can configure SMTC measurement window with a longer period and/or a shorter length for the terminal device, so that the number of measurements and measurement time of the terminal device will be reduced. It should be noted that the SMTC measurement window configured by the network side can be configured per SCG or per frequency.

In an optional manner of the present disclosure, in response to that a service frequency point of the SCG in the activated state is configured as a measurement frequency point by the MCG, the first indication information being used to indicate the first behavior of the terminal device when the SCG is in the deactivated state includes at least one of the following:

the terminal device performs a measurement on a service frequency point of an SCG side based on the SMTC configuration configured by a network side.

In the embodiment of the present disclosure, if the service frequency points of the deactivated SCG are simultaneously configured as the measurement frequency points by the MCG, the configuration of the SMTC measurement window with a longer period is not used for the frequency points, and the measurement is still performed according to the existing original measurement requirements (for example, the period of the SMTC measurement window originally configured).

In an optional manner of the present disclosure, the second indication information being used to indicate a first behavior corresponding to the SCG being in the activated state includes:

the terminal device performs a measurement on a service frequency point of an SCG side based on the SMTC configuration configured by a network side.

In the embodiment of the present disclosure, after the terminal device receives the SCG activation indication information, the SCG is in an activated state (or the SCG is activated), and the terminal device ignores the SMTC cycle limit configured by the network side, and the measurement is still performed according to the existing original measurement requirements (such as the period of the SMTC measurement window originally configured).

(5) Dynamically Changing the Frequency Layer of RRM Measurement

In an optional manner of the present disclosure, the first indication information is further used to indicate whether to perform a function of dynamically changing at least one of a measurement object or a measurement identification; and in response to that the first indication information indicates to perform the function of dynamically changing at least one of the measurement object or the measurement identification, the first indication information being used to indicate the first behavior of the terminal device when the SCG is in the deactivated state includes at least one of the following:

the terminal device performs at least one of a measurement or a measurement reporting for at least one measurement object;

the terminal device performs at least one of a measurement or a measurement reporting for at least one measurement identification.

The at least one measurement object and the at least one measurement identification are determined based on a configuration of a network side.

In an optional manner of the present disclosure, the second indication information is further used to indicate whether to perform a function of dynamically changing at least one of a measurement object or a measurement identification; and in response to that the second indication information indicates to perform the function of dynamically changing at least one of the measurement object or the measurement identification, the second indication information being used to indicate the second behavior of the terminal device when the SCG is in the activated state includes at least one of the following:

the terminal device stops performing at least one of a measurement or a measurement reporting for at least one measurement object;

the terminal device stops performing at least one of a measurement or a measurement reporting for at least one measurement identification.

The at least one measurement object and the at least one measurement identification are determined based on a configuration of a network side.

In the above scheme, the at least one measurement object is determined based on second configuration information, the second configuration information is used to configure a group of measurement objects, each measurement object in the group of measurement objects is associated with one indication information, and the indication information is used to indicate whether the measurement object is measured when the SCG is in the deactivated state. The at least one measurement identification is determined based on third configuration information, the third configuration information is used to configure a group of measurement identifications, each measurement identification in the group of measurement identifications is associated with one indication information, and the indication information is used to indicate whether a measurement object associated with the measurement identification is measured when the SCG is in the deactivated state.

In an example, a group of measurement objects are configured by the network side, each measurement object is associated with one indication information, and the indication information is used to indicate whether the measurement object is measured when the SCG is in the deactivated state. The terminal device has received first indication information (or SCG deactivation indication information), and the first indication information is used to indicate whether to perform a function of dynamically changing a measurement object. If yes, after the SCG is deactivated, the terminal device performs at least one of a measurement or a measurement reporting on the measurement object that is configured by the network side and can be measured when the SCG is deactivated. The terminal device has received second indication information (or SCG activation indication information), and the second indication information is used to indicate whether to perform a function of dynamically changing a measurement object. If yes, after the SCG is activated, the terminal device stops performing at least one of a measurement or a measurement reporting on the measurement object that is configured by the network side and can be measured when the SCG is deactivated.

It should be noted that a plurality of schemes of the first behavior can be implemented individually or in combination, and a plurality of schemes of the second behavior can be implemented individually or in combination.

FIG. 4 is a first structural composition diagram of an apparatus for information indication provided by the embodiment of the present disclosure, and the apparatus is applied to a terminal device. As illustrated in FIG. 4, the apparatus for information indication includes a receiving unit 401.

The receiving unit 401 is configured to receive first indication information or second indication information, the first indication information being used to indicate a first behavior of the terminal device when a secondary cell group (SCG) is in a deactivated state, the second indication information being used to indicate a second behavior of the terminal device when the SCG is in an activated state.

In an optional manner, the first indication information being used to indicate the first behavior of the terminal device when the SCG is in the deactivated state includes at least one of the following:

the terminal device determines an actual uplink maximum transmit power based on at least one of an uplink maximum transmit power supported by the terminal device or a cell maximum transmit power;

the terminal device reports a power headroom report (PHR).

In an optional manner, the terminal device ignores an uplink transmit power limit configured by a network side in response to determining, by the terminal device, the actual uplink maximum transmit power based on at least one of the uplink maximum transmit power supported by the terminal device or the cell maximum transmit power.

In an optional manner, the second indication information being used to indicate the second behavior of the terminal device when the SCG is in the activated state includes at least one of the following:

the terminal device determines an actual uplink maximum transmit power based on an uplink transmit power limit configured by a network side;

the terminal device reports a PHR.

In an optional manner, the first indication information being used to indicate the first behavior of the terminal device when the SCG is in the deactivated state includes:

the terminal device enables at least one of a robust header compression (ROHC) function or an Ethernet header compression (EHC) function of at least one designated data resource bearer (DRB), and the at least one DRB is determined based on a configuration of a network side.

In an optional manner, the second indication information being used to indicate the second behavior of the terminal device when the SCG is in the activated state includes:

the terminal device disables at least one of an ROHC function or an EHC function of at least one designated DRB, and the at least one DRB is determined based on a configuration of a network side.

In an optional manner, the at least one DRB is determined based on first configuration information, and the first configuration information is used to configure at least one of the ROHC function or the EHC function of at least one DRB to support disabling and enabling dynamically.

In an optional manner, the first indication information is further used to indicate a first physical downlink control channel (PDCCH) blind detection configuration employed when the SCG is in the deactivated state;

correspondingly, the first indication information being used to indicate the first behavior of the terminal device when the SCG is in the deactivated state includes:

the terminal device performs PDCCH blind detection on a search space in a target slot on a master cell group (MCG) side according to the first PDCCH blind detection configuration.

In an optional manner, the second indication information being used to indicate the second behavior of the terminal device when the SCG is in the activated state includes:

the terminal device performs PDCCH blind detection on a search space in a target slot on an MCG side according to a second PDCCH blind detection configuration configured by a network side.

In an optional manner, the receiving unit 401 is further configured to receive third indication information, the third indication information being used to indicate whether to dynamically change a PDCCH blind detection limit;

the apparatus further includes a processing unit 402. The processing unit 402 is configured to: in response to that the third indication information indicates to dynamically change the PDCCH blind detection limit, perform PDCCH blind detection on the search space in the target slot on the MCG side according to a first PDCCH blind detection configuration when the SCG is in the deactivated state; perform PDCCH blind detection on the search space in the target slot on the MCG side according to a second PDCCH blind detection configuration configured by a network side when the SCG is in the activated state; in response to that the third indication information indicates not to dynamically change the PDCCH blind detection limit, perform PDCCH blind detection on the search space in the target slot on the MCG side according to the second PDCCH blind detection configuration configured by the network side when the SCG is in the deactivated state or the activated state.

In an optional manner, the first indication information being used to indicate the first behavior of the terminal device when the SCG is in the deactivated state includes:

the terminal device performs a measurement on a service frequency point of an SCG side based on an SS/PBCH block measurement timing configuration (SMTC) cycle limit configured by a network side.

In an optional manner, the SMTC cycle limit configured by the network side is used to indicate that the terminal device performs a measurement on one SMTC measurement window in every N SMTC measurement windows, N being an integer greater than 1.

In an optional manner, the SMTC cycle limit configured by the network side is used to indicate at least one of a first period or a first length of an SMTC measurement window, the first period is greater than or equal to a designated period, and the first length is less than or equal to a designated length.

In an optional manner, in response to that a service frequency point of the SCG in the activated state is configured as a measurement frequency point by the MCG, the first indication information being used to indicate the first behavior of the terminal device when the SCG is in the deactivated state includes:

the terminal device performs a measurement on a service frequency point of an SCG side based on an SMTC configuration configured by a network side.

In an optional manner, the second indication information being used to indicate a first behavior corresponding to the SCG being in the activated state includes:

the terminal device performs a measurement on a service frequency point of an SCG side based on an SMTC configuration configured by a network side.

In an optional manner, the first indication information is further used to indicate whether to perform a function of dynamically changing at least one of a measurement object or a measurement identification; and in response to that the first indication information indicates to perform the function of dynamically changing at least one of the measurement object or the measurement identification, the first indication information being used to indicate the first behavior of the terminal device when the SCG is in the deactivated state includes at least one of the following:

the terminal device performs at least one of a measurement or a measurement reporting for at least one measurement object;

the terminal device performs at least one of a measurement or a measurement reporting for at least one measurement identification.

The at least one measurement object and the at least one measurement identification are determined based on a configuration of a network side.

In an optional manner, the second indication information is further used to indicate whether to perform a function of dynamically changing at least one of a measurement object or a measurement identification; and in response to that the second indication information indicates to perform the function of dynamically changing at least one of the measurement object or the measurement identification, the second indication information being used to indicate the second behavior of the terminal device when the SCG is in the activated state includes at least one of the following:

the terminal device stops performing at least one of a measurement or a measurement reporting for at least one measurement object;

the terminal device stops performing at least one of a measurement or a measurement reporting for at least one measurement identification.

The at least one measurement object and the at least one measurement identification are determined based on a configuration of a network side.

In an optional manner, the at least one measurement object is determined based on second configuration information, the second configuration information is used to configure a group of measurement objects, each measurement object in the group of measurement objects is associated with one indication information, and the indication information is used to indicate whether the measurement object is measured when the SCG is in the deactivated state;

the at least one measurement identification is determined based on third configuration information, the third configuration information is used to configure a group of measurement identifications, each measurement identification in the group of measurement identifications is associated with one indication information, and the indication information is used to indicate whether a measurement object associated with the measurement identification is measured when the SCG is in the deactivated state.

In an optional manner, the first indication information is SCG deactivation indication information, and the SCG deactivation indication information is used to trigger the SCG to enter the deactivated state; or the first indication information is indication information different from the SCG deactivation indication information.

In an optional manner, the second indication information is SCG activation indication information, and the SCG activation indication information is used to trigger the SCG to enter the activated state; or the second indication information is indication information different from the SCG activation indication information.

It will be understood by those skilled in the art that the above description of the apparatus for information indication of the embodiment of the present disclosure may be understood with reference to the description of the method for information indication of the embodiment of the present disclosure.

FIG. 5 is a second structural composition diagram of an apparatus for information indication provided by the embodiment of the present disclosure, and the apparatus is applied to a network device. As illustrated in FIG. 5, the apparatus for information indication includes a transmitting unit 501.

The transmitting unit 501 is configured to transmit first indication information or second indication information to a terminal device, the first indication information being used to indicate a first behavior of the terminal device when a secondary cell group (SCG) is in a deactivated state, the second indication information being used to indicate a second behavior of the terminal device when the SCG is in an activated state.

In an optional manner, the first indication information being used to indicate the first behavior of the terminal device when the SCG is in the deactivated state includes at least one of the following:

the terminal device determines an actual uplink maximum transmit power based on at least one of an uplink maximum transmit power supported by the terminal device or a cell maximum transmit power;

the terminal device reports a power headroom report (PHR).

In an optional manner, the second indication information being used to indicate the second behavior of the terminal device when the SCG is in the activated state includes at least one of the following:

the terminal device determines an actual uplink maximum transmit power based on an uplink transmit power limit configured by a network side;

the terminal device reports a PHR.

In an optional manner, the first indication information being used to indicate the first behavior of the terminal device when the SCG is in the deactivated state includes:

the terminal device enables at least one of a robust header compression (ROHC) function or an Ethernet header compression (EHC) function of at least one designated data resource bearer (DRB), and the at least one DRB is determined based on a configuration of a network side.

In an optional manner, the second indication information being used to indicate the second behavior of the terminal device when the SCG is in the activated state includes:

the terminal device disables at least one of an ROHC function or an EHC function of at least one designated DRB, and the at least one DRB is determined based on a configuration of a network side.

In an optional manner, the at least one DRB is determined based on first configuration information, and the first configuration information is used to configure at least one of the ROHC function or the EHC function of at least one DRB to support disabling and enabling dynamically.

In an optional manner, the first indication information is further used to indicate a first physical downlink control channel (PDCCH) blind detection configuration employed when the SCG is in the deactivated state;

correspondingly, the first indication information being used to indicate the first behavior of the terminal device when the SCG is in the deactivated state includes:

the terminal device performs PDCCH blind detection on a search space in a target slot on a master cell group (MCG) side according to the first PDCCH blind detection configuration.

In an optional manner, the second indication information being used to indicate the second behavior of the terminal device when the SCG is in the activated state includes:

the terminal device performs PDCCH blind detection on a search space in a target slot on an MCG side according to a second PDCCH blind detection configuration configured by a network side.

In an optional manner, the transmitting unit 501 is further configured to transmit third indication information to the terminal device, the third indication information being used to indicate whether to dynamically change a PDCCH blind detection limit;

In an optional manner, the first indication information being used to indicate the first behavior of the terminal device when the SCG is in the deactivated state includes:

the terminal device performs a measurement on a service frequency point of an SCG side based on an SS/PBCH block measurement timing configuration (SMTC) cycle limit configured by a network side.

In an optional manner, the SMTC cycle limit configured by the network side is used to indicate that the terminal device performs a measurement on one SMTC measurement window in every N SMTC measurement windows, N being an integer greater than 1.

In an optional manner, the SMTC cycle limit configured by the network side is used to indicate at least one of a first period or a first length of an SMTC measurement window, the first period is greater than or equal to a designated period, and the first length is less than or equal to a designated length.

In an optional manner, in response to that a service frequency point of the SCG in the activated state is configured as a measurement frequency point by the MCG, the first indication information being used to indicate the first behavior of the terminal device when the SCG is in the deactivated state includes:

the terminal device performs a measurement on a service frequency point of an SCG side based on an SMTC configuration configured by a network side.

In an optional manner, the second indication information being used to indicate a first behavior corresponding to the SCG being in the activated state includes:

the terminal device performs a measurement on a service frequency point of an SCG side based on an SMTC configuration configured by a network side.

In an optional manner, the first indication information is further used to indicate whether to perform a function of dynamically changing at least one of a measurement object or a measurement identification; and in response to that the first indication information indicates to perform the function of dynamically changing at least one of the measurement object or the measurement identification, the first indication information being used to indicate the first behavior of the terminal device when the SCG is in the deactivated state includes at least one of the following:

the terminal device performs at least one of a measurement or a measurement reporting for at least one measurement object;

the terminal device performs at least one of a measurement or a measurement reporting for at least one measurement identification.

The at least one measurement object and the at least one measurement identification are determined based on a configuration of a network side.

In an optional manner, the second indication information is further used to indicate whether to perform a function of dynamically changing at least one of a measurement object or a measurement identification; and in response to that the second indication information indicates to perform the function of dynamically changing at least one of the measurement object or the measurement identification, the second indication information being used to indicate the second behavior of the terminal device when the SCG is in the activated state includes at least one of the following:

the terminal device stops performing at least one of a measurement or a measurement reporting for at least one measurement object;

the terminal device stops performing at least one of a measurement or a measurement reporting for at least one measurement identification.

The at least one measurement object and the at least one measurement identification are determined based on a configuration of a network side.

In an optional manner, the at least one measurement object is determined based on second configuration information, the second configuration information is used to configure a group of measurement objects, each measurement object in the group of measurement objects is associated with one indication information, and the indication information is used to indicate whether the measurement object is measured when the SCG is in the deactivated state;

the at least one measurement identification is determined based on third configuration information, the third configuration information is used to configure a group of measurement identifications, each measurement identification in the group of measurement identifications is associated with one indication information, and the indication information is used to indicate whether a measurement object associated with the measurement identification is measured when the SCG is in the deactivated state.

In an optional manner, the first indication information is SCG deactivation indication information, and the SCG deactivation indication information is used to trigger the SCG to enter the deactivated state; or the first indication information is indication information different from the SCG deactivation indication information.

In an optional manner, the second indication information is SCG activation indication information, and the SCG activation indication information is used to trigger the SCG to enter the activated state; or the second indication information is indication information different from the SCG activation indication information.

It will be understood by those skilled in the art that the related description of the above apparatus for information indication of the embodiment of the present disclosure may be understood with reference to the related description of the method for information indication of the embodiment of the present disclosure.

Figure 6:
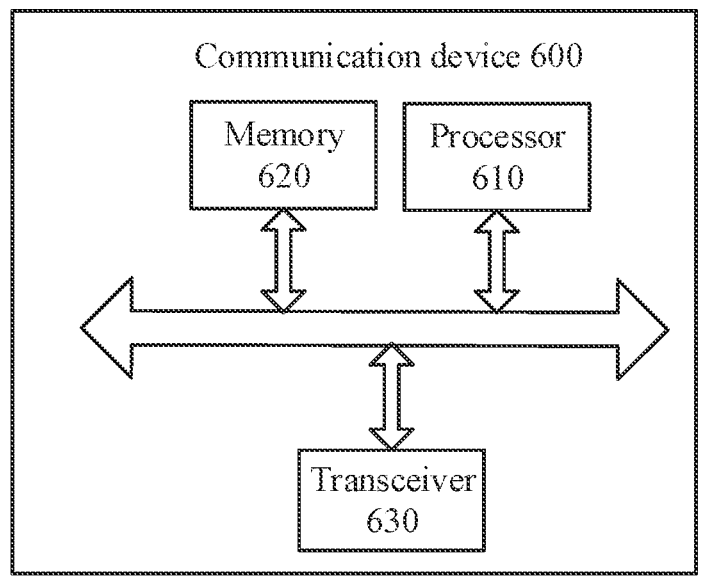
FIG. 6 is a schematic structural diagram of a communication device provided by an embodiment of the present disclosure.

FIG. 6 is a schematic structural diagram of a communication device 600 provided by an embodiment of the present disclosure. The communication device may be a terminal device or a network device and the communication device 600 illustrated in FIG. 6 includes a processor 610 that can call and execute a computer program from memory to implement the method in an embodiment of the present disclosure.

Optionally, as illustrated in FIG. 6, the communication device 600 may also include a memory 620. The processor 610 that can call and execute a computer program from memory 620 to implement a method in an embodiment of the present disclosure.

The memory 620 may be a separate device independent of the processor 610 or may be integrated in the processor 610.

Optionally, as illustrated in FIG. 6, the communication device 600 may also include a transceiver 630, the processor 610 may control the transceiver 630 to communicate with other devices, and in particular may send information or data to other devices, or receive information or data sent by other devices.

The transceiver 630 may include a transmitter and a receiver. The transceiver 630 may further include antennas, and the number of antennas may be one or more.

Optionally, the communication device 600 may be specifically a network device of an embodiment of the present disclosure, and the communication device 600 may implement corresponding processes implemented by the network device in the respective methods of the embodiment of the present disclosure, which will not be repeated here for the sake of brevity.

Optionally, the communication device 600 may be specifically a mobile terminal/a terminal device of an embodiment of the present disclosure, and the communication device 600 may implement corresponding processes implemented by the mobile terminal/the terminal device in the respective methods of the embodiment of the present disclosure, which will not be repeated here for the sake of brevity.

Figure 7:
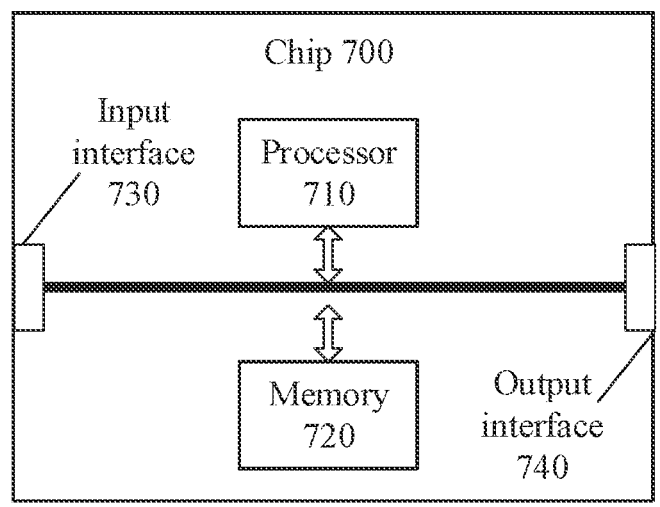
FIG. 7 is a schematic diagram of a chip according to an embodiment of the present disclosure.

FIG. 7 is a schematic structural diagram of a chip according to an embodiment of the present disclosure. A chip 700 illustrated in FIG. 7 includes a processor 710 that can call and execute a computer program from memory to implement the method in an embodiment of the present disclosure.

Optionally, as illustrated in FIG. 7, the chip 700 may also include a memory 720. The processor 710 that can call and execute a computer program from memory 720 to implement a method in an embodiment of the present disclosure.

The memory 720 may be a separate device independent of the processor 710 or may be integrated in the processor 710.

Optionally, the chip 700 may also include an input interface 730. The processor 710 may control the input interface 730 to communicate with other devices or chips, and in particular may obtain information or data sent by other devices or chips.

Optionally, the chip 700 may also include an output interface 740. The processor 710 may control the output interface 740 to communicate with other devices or chips, and in particular may output information or data to other devices or chips.

Optionally, the chip may applied to be a network device of an embodiment of the present disclosure, and the chip may implement corresponding processes implemented by the network device in the respective methods of the embodiments of the present disclosure, which will not be repeated here for the sake of brevity.

Optionally, the chip may applied to be the mobile terminal/terminal device of an embodiment of the present disclosure, and the chip may implement corresponding processes implemented by the mobile terminal/the terminal device in the respective methods of the embodiments of the present disclosure, which will not be repeated here for the sake of brevity.

It should be understood that the chip referred to in embodiments of the present disclosure may also be referred to as a system-level chip, a system chip, a chip system or a system-on-chip or the like.

Figure 8:
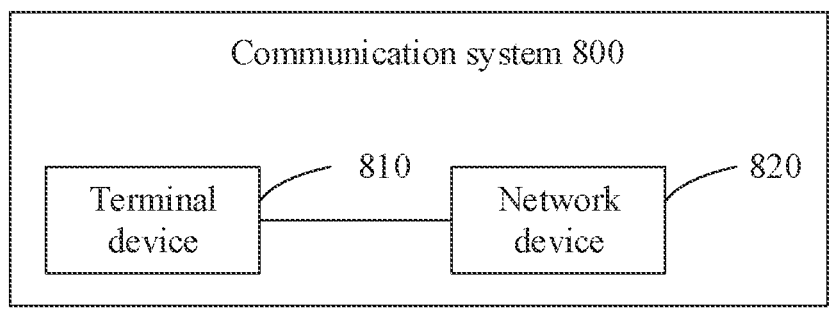
FIG. 8 is a schematic block diagram of a communication system provided by an embodiment of the present disclosure.

FIG. 8 is a schematic block diagram of a communication system 800 provided by an embodiment of the present disclosure. As illustrated in FIG. 8, the communication system 800 includes a terminal device 810 and a network device 820.

The terminal device 810 may be configured to implement corresponding functions implemented by the terminal device in the above method, and the network device 820 may be configured to implement corresponding functions implemented by the network device in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in embodiments of the present disclosure. The general purpose processor can be a microprocessor or any conventional processor. The operations of the method disclosed in the embodiment of the present disclosure can be directly embodied as the completion of the execution of the hardware decoding processor or the completion of the combined execution of the hardware and software modules in the decoding processor. The software module may be located in RAM, flash memory, read-only memory, programmable read-only memory or electrically erasable programmable memory, registers and other mature storage media in the art. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory of the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, which is configured to store a computer program.

Optionally, the computer-readable storage medium may be applied to the network device of the embodiment of the present disclosure, and the computer program causes a computer to implement corresponding processes implemented by the network device in the respective methods of the embodiments of the present disclosure, which will not be repeated here for the sake of brevity.

Optionally, the computer-readable storage medium may be applied to the mobile terminal/a terminal device of the embodiment of the present disclosure, and the computer program causes a computer to implement corresponding processes implemented by the mobile terminal/terminal device in the respective methods of the embodiments of the present disclosure, which will not be repeated here for the sake of brevity.

In an embodiment of the present disclosure, there is further provided a computer program product, which includes computer program instructions.

Optionally, the computer program product may be applied to the network device of the embodiment of the present disclosure, and the computer program instructions cause a computer to implement corresponding processes implemented by the network device in the respective methods of the embodiment of the present disclosure, which will not be repeated here for the sake of brevity.

Optionally, the computer program product may be applied to the mobile terminal/a terminal device of the embodiment of the present disclosure, and the computer program instructions causes a computer to implement corresponding processes implemented by the mobile terminal/the terminal device in the respective methods of the embodiments of the present disclosure, which will not be repeated here for the sake of brevity.

In an embodiment of the present disclosure, there is further provided a computer program.

Optionally, the computer program may be applied to the network device of the embodiment of the present disclosure, when run on the computer, the computer program causes a computer to implement corresponding processes implemented by the network device in the respective methods of the embodiments of the present disclosure, which will not be repeated here for the sake of brevity.

Optionally, the computer program may be applied to the mobile terminal/terminal device of the embodiment of the present disclosure, when run on the computer, the computer program causes a computer to implement corresponding processes implemented by the mobile terminal/terminal device in the respective methods of the embodiments of the present disclosure, which will not be repeated here for the sake of brevity.

Those of ordinary skill in the art may realize that the various example units and algorithm steps described in connection with the embodiments disclosed herein can be implemented in electronic hardware or a combination of computer software and electronic hardware. Whether these functions are performed in hardware or software depends on the specific application and design constraints of the technical solution. Professionals can use different methods for each particular application to implement the described functionality but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiment of the apparatus is only schematic, for example, the division of the unit is only a logical function division, and in practice, there may be another division mode, for example, multiple units or components may be combined or integrated into another system, or some features may be ignored or not performed. On the other hand, the coupling or direct coupling or communication connection between each other illustrated or discussed may be indirect coupling or communication connection through some interface, device or unit, and may be electrical, mechanical or other form.

The units illustrated as separate elements may or may not be physically separated, and the elements displayed as units may or may not be physical units, i.e. may be located in a place, or may be distributed over a plurality of network units. Part or all of the units can be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in a form of a software functional unit and sold or used as an independent product, they may be stored in a computer readable storage medium. Based on such an understanding, the technical solutions according to the disclosure in essence or the part contributing to the prior art, or part of the technical solutions can be embodied in the form of a software product. The computer software product is stored in a storage medium, and includes several instructions so that a computer device (which may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art can easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method for information indication, comprising:
receiving, by a terminal device, first indication information or second indication information, the first indication information being used to indicate a first behavior of the terminal device when a secondary cell group (SCG) is in a deactivated state, the second indication information being used to indicate a second behavior of the terminal device when the SCG is in an activated state,
wherein the first indication information being used to indicate the first behavior of the terminal device when the SCG is in the deactivated state comprises:
the terminal device performs a measurement on a service frequency point of an SCG side based on an SS/PBCH block measurement timing configuration (SMTC) cycle limit configured by a network side,
wherein the SMTC cycle limit configured by the network side is used to indicate that the terminal device performs a measurement on one SMTC measurement window in every N SMTC measurement windows, N being an integer greater than 1; or the SMTC cycle limit configured by the network side is used to indicate at least one of a first period or a first length of an SMTC measurement window, the first period is greater than or equal to a designated period, and the first length is less than or equal to a designated length.

2. The method of claim 1, wherein the first indication information being used to indicate the first behavior of the terminal device when the SCG is in the deactivated state further comprises at least one of the following:

the terminal device determines an actual uplink maximum transmit power based on at least one of an uplink maximum transmit power supported by the terminal device or a cell maximum transmit power;

the terminal device reports a power headroom report (PHR), wherein the terminal device ignores an uplink transmit power limit configured by the network side in response to determining, by the terminal device, the actual uplink maximum transmit power based on at least one of the uplink maximum transmit power supported by the terminal device or the cell maximum transmit power.

3. The method of claim 1, wherein the second indication information being used to indicate the second behavior of the terminal device when the SCG is in the activated state comprises at least one of the following:

the terminal device determines an actual uplink maximum transmit power based on an uplink transmit power limit configured by the network side;

the terminal device reports a PHR.

4. The method of claim 1, wherein the first indication information being used to indicate the first behavior of the terminal device when the SCG is in the deactivated state further comprises:

the terminal device enables at least one of a robust header compression (ROHC) function or an Ethernet header compression (EHC) function of at least one designated data resource bearer (DRB), wherein the at least one DRB is determined based on a configuration of the network side.

5. The method of claim 1, wherein the second indication information being used to indicate the second behavior of the terminal device when the SCG is in the activated state comprises:

the terminal device disables at least one of an ROHC function or an EHC function of at least one designated DRB, wherein the at least one DRB is determined based on a configuration of the network side.

6. The method of claim 4, wherein the at least one DRB is determined based on first configuration information, and the first configuration information is used to configure at least one of the ROHC function or the EHC function of at least one DRB to support disabling and enabling dynamically.

7. The method of claim 1, wherein the first indication information is further used to indicate a first physical downlink control channel (PDCCH) blind detection configuration employed when the SCG is in the deactivated state; and correspondingly, the first indication information being used to indicate the first behavior of the terminal device when the SCG is in the deactivated state further comprises:

the terminal device performs PDCCH blind detection on a search space in a target slot on a master cell group (MCG) side according to the first PDCCH blind detection configuration.

8. The method of claim 1, wherein the second indication information being used to indicate the second behavior of the terminal device when the SCG is in the activated state comprises:

the terminal device performs PDCCH blind detection on a search space in a target slot on an MCG side according to a second PDCCH blind detection configuration configured by the network side.

9. The method of claim 7, further comprising:

receiving, by the terminal device, third indication information, the third indication information being used to indicate whether to dynamically change a PDCCH blind detection limit;

in response to that the third indication information indicates to dynamically change the PDCCH blind detection limit, performing, by the terminal device, PDCCH blind detection on the search space in the target slot on the MCG side according to a first PDCCH blind detection configuration when the SCG is in the deactivated state; performing, by the terminal device, PDCCH blind detection on the search space in the target slot on the MCG side according to a second PDCCH blind detection configuration configured by the network side when the SCG is in the activated state;

in response to that the third indication information indicates not to dynamically change the PDCCH blind detection limit, performing, by the terminal device, PDCCH blind detection on the search space in the target slot on the MCG side according to the second PDCCH blind detection configuration configured by the network side when the SCG is in the deactivated state or the activated state.

10. A terminal device, comprising a processor and a memory, wherein the memory is configured to store a computer program, and the processor is configured to call and execute the computer program stored in the memory to cause the terminal device to:

receive first indication information or second indication information, the first indication information being used to indicate a first behavior of the terminal device when a secondary cell group (SCG) is in a deactivated state, the second indication information being used to indicate a second behavior of the terminal device when the SCG is in an activated state, wherein the first indication information being used to indicate the first behavior of the terminal device when the SCG is in the deactivated state comprises:

the terminal device performs a measurement on a service frequency point of an SCG side based on an SS/PBCH block measurement timing configuration (SMTC) cycle limit configured by a network side, wherein the SMTC cycle limit configured by the network side is used to indicate that the terminal device performs a measurement on one SMTC measurement window in every N SMTC measurement windows, N being an integer greater than 1; or the SMTC cycle limit configured by the network side is used to indicate at least one of a first period or a first length of an SMTC measurement window, the first period is greater than or equal to a designated period, and the first length is less than or equal to a designated length.

11. The terminal device of claim 10, wherein the first indication information being used to indicate the first behavior of the terminal device when the SCG is in the deactivated state further comprises at least one of the following:
the terminal device determines an actual uplink maximum transmit power based on at least one of an uplink maximum transmit power supported by the terminal device or a cell maximum transmit power;
the terminal device reports a power headroom report (PHR),
wherein the terminal device ignores an uplink transmit power limit configured by the network side in response to determining, by the terminal device, the actual uplink maximum transmit power based on at least one of the uplink maximum transmit power supported by the terminal device or the cell maximum transmit power.

12. The terminal device of claim 10, wherein the second indication information being used to indicate the second behavior of the terminal device when the SCG is in the activated state comprises at least one of the following:
the terminal device determines an actual uplink maximum transmit power based on an uplink transmit power limit configured by the network side;
the terminal device reports a PHR.

13. The terminal device of claim 10, wherein the first indication information being used to indicate the first behavior of the terminal device when the SCG is in the deactivated state further comprises:
the terminal device enables at least one of a robust header compression (ROHC) function or an Ethernet header compression (EHC) function of at least one designated data resource bearer (DRB), wherein the at least one DRB is determined based on a configuration of the network side.

14. The terminal device of claim 10, wherein the second indication information being used to indicate the second behavior of the terminal device when the SCG is in the activated state comprises:
the terminal device disables at least one of an ROHC function or an EHC function of at least one designated DRB, wherein the at least one DRB is determined based on a configuration of the network side.

15. The terminal device of claim 13, wherein the at least one DRB is determined based on first configuration information, and the first configuration information is used to configure at least one of the ROHC function or the EHC function of at least one DRB to support disabling and enabling dynamically.

16. The terminal device of claim 10, wherein the first indication information is further used to indicate whether to perform a function of dynamically changing at least one of a measurement object or a measurement identification; and in response to that the first indication information indicates to perform the function of dynamically changing at least one of the measurement object or the measurement identification,
the first indication information being used to indicate the first behavior of the terminal device when the SCG is in the deactivated state further comprises at least one of the following:
the terminal device performs at least one of a measurement or a measurement reporting for at least one measurement object;
the terminal device performs at least one of a measurement or a measurement reporting for at least one measurement identification,
wherein the at least one measurement object and the at least one measurement identification are determined based on a configuration of the network side.

17. The terminal device of claim 10, wherein the second indication information is further used to indicate whether to perform a function of dynamically changing at least one of a measurement object or a measurement identification; and in response to that the second indication information indicates to perform the function of dynamically changing at least one of the measurement object or the measurement identification,
the second indication information being used to indicate the second behavior of the terminal device when the SCG is in the activated state comprises at least one of the following:
the terminal device stops performing at least one of a measurement or a measurement reporting for at least one measurement object;
the terminal device stops performing at least one of a measurement or a measurement reporting for at least one measurement identification,
wherein the at least one measurement object and the at least one measurement identification are determined based on a configuration of the network side.

18. A network device, comprising a processor and a memory, wherein
the memory is configured to store a computer program, and
the processor is configured to call and execute the computer program stored in the memory to cause the network device to:
transmit first indication information or second indication information to a terminal device, the first indication information being used to indicate a first behavior of the terminal device when a secondary cell group (SCG) is in a deactivated state, the second indication information being used to indicate a second behavior of the terminal device when the SCG is in an activated state,
wherein the first indication information being used to indicate the first behavior of the terminal device when the SCG is in the deactivated state comprises:
the terminal device performs a measurement on a service frequency point of an SCG side based on an SS/PBCH block measurement timing configuration (SMTC) cycle limit configured by a network side,
wherein the SMTC cycle limit configured by the network side is used to indicate that the terminal device performs a measurement on one SMTC measurement window in every N SMTC measurement windows, N being an integer greater than 1; or
the SMTC cycle limit configured by the network side is used to indicate at least one of a first period or a first length of an SMTC measurement window, the first period is greater than or equal to a designated period, and the first length is less than or equal to a designated length.

19. The network device of claim 18, wherein the first indication information being used to indicate the first behavior of the terminal device when the SCG is in the deactivated state further comprises at least one of the following:
the terminal device determines an actual uplink maximum transmit power based on at least one of an uplink maximum transmit power supported by the terminal device or a cell maximum transmit power;

the terminal device reports a power headroom report (PHR), wherein the terminal device ignores an uplink transmit power limit configured by the network side in response to determining, by the terminal device, the actual uplink maximum transmit power based on at least one of the uplink maximum transmit power supported by the terminal device or the cell maximum transmit power.

20. The network device of claim 18, wherein the second indication information being used to indicate the second behavior of the terminal device when the SCG is in the activated state comprises at least one of the following:

the terminal device determines an actual uplink maximum transmit power based on an uplink transmit power limit configured by the network side;

the terminal device reports a PHR.

* * * * *